United States Patent [19]

Yamada

[11] Patent Number: 5,695,544
[45] Date of Patent: Dec. 9, 1997

[54] SILICON NITRIDE BASED SINTERED PRODUCT

[75] Inventor: Toshiyuki Yamada, Yamato, Japan

[73] Assignee: Isuzu Ceramics Research Institute Co., Ld., Fujisawa, Japan

[21] Appl. No.: 634,234

[22] Filed: Apr. 18, 1996

[30] Foreign Application Priority Data

Sep. 22, 1995 [JP] Japan .................. 7-269487

[51] Int. Cl.$^6$ .................................................. B22F 1/00
[52] U.S. Cl. .................. 75/233; 75/232; 419/10; 419/13; 419/19; 419/20; 501/97; 501/98
[58] Field of Search .................. 419/10, 13, 19, 419/20; 501/97, 98; 75/232, 233

[56] References Cited

U.S. PATENT DOCUMENTS

| | | |
|---|---|---|
| 4,407,970 | 10/1983 | Komatsu et al. |
| 4,902,653 | 2/1990 | Komatsu et al. |
| 5,032,554 | 7/1991 | Mizuno et al. |
| 5,114,888 | 5/1992 | Mizuno et al. |
| 5,118,645 | 6/1992 | Pyzik et al. |
| 5,120,328 | 6/1992 | Pyzik et al. |

*Primary Examiner*—Charles T. Jordan
*Assistant Examiner*—Anthony R. Chi
*Attorney, Agent, or Firm*—Staas & Halsey

[57] ABSTRACT

A silicon nitride based sintered product having strength at a high temperature is obtained by sintering a mixture. The mixture comprises a silicon powder or a mixture powder of silicon and silicon nitride added a sintering assistant powder, a compound powder of iron and a compound powder containing at least one of vanadium, niobium and tantalum in 5a group elements of the periodic table. The silicon nitride based sintered product contains silicon, aluminum, yttrium, oxygen, nitrogen, iron and at least one of 5a group element in the periodic table, and when weights at which the elements are present as a compound of silicon nitride, alumina, yttria, a compound powder of iron and 5a group elements in the periodic table are represented by a, b, c, d and e, the following formulae are fulfilled:

$1 \leq 100(b+c+d+e) \times (a+b+c+d+e) \leq 15$, $1 \leq (b+c)/d$, $0.005 \leq 100d/(a+b+c+d+e) \leq 7.5$, and $0.005 \leq e/(b+c) \leq 1$

10 Claims, 6 Drawing Sheets

SINTERED SURFACE

SECTION OF SURFACE LAYER PORTION OF SINTERED SILICON NITRIDE BASED SINTERRED SURFACE BLACK POINTS: ALMINUM (Al)

———— 400 μm

SINTERED SURFACE → SECTION OF SURFACE LAYER PORTION OF SINTERED SILICON NITRIDE BASED SINTERED SURFACE BLACK POINTS: ALMINUM (Al)
400 μm

SECTION OF SURFACE LAYER PORTION OF SILICON NITRIDE BASED SINTERED PRODUCT
BLACK POINTS: ALMINUM (Al)

SILICON NITRIDE BASED SINTERED PRODUCT

BACKGROUND OF THE INVENTION

The present invention relates to a silicon nitride based sintered product essentially consisting of an inexpensive silicon powder, particularly to a silicon nitride based sintered product which is excellent in heat resistance, resistance to thermal shock and corrosion resistance.

As disclosed in Japanese Patent Laid-Open No. 191,063/1985, there is known a silicon nitride based sintered product in which oxide of 3a group elements in the periodic table having an ion radius of 0.97 angstrom or less, oxide of 4a group elements in the periodic table having an ion radius of 0.97 angstrom or more, and oxide or nitride of 2a group elements in the periodic table are added to the silicon nitride.

Further, as disclosed in Japanese Patent Laid-Open No. 248,773/1988, there is known a silicon nitride based sintered product in which oxide of 3a group elements in the periodic table and oxide of 4a group elements in the periodic table are added to β-silicon nitride. However, a silicon nitride based sintered product having strength at a high temperature cannot be obtained merely by adding 3a group rare earth elements in the periodic table to silicon nitride. On the other hand, when alumina (A12033) is added to silicon nitride, the fineness can be promoted, but there poses a problem in that a softening point of a grain boundary phase is so low that the strength at a high temperature materially lowers.

Japanese Patent Laid-Open No. 345,536/1994 publication discloses a method of increasing a strength of a sintered surface of a silicon nitride based sintered product in which in sintering, silicon nitride ($Si_3N_4$) powder, powder of silicon nitride and silicon or powder of silicon nitride, yttria ($Y_2O_3$) and alumina ($Al_2O_3$) is used as a filling powder (used to fill a space between a crucible and a molded product) to perform the sintering. However, when silicon nitride powder or powder of silicon nitride and silicon is used, the sintering assistant component in the molded product becomes dispersed into the silicon nitride powder as the filling powder so that the sintering of the sintered product is not promoted and the density thereof is low, failing to obtain satisfactory strength. Further, when powder of silicon nitride, yttria and alumina is used, the filling powder itself is apt to be sintered, and the sintered filling powder is adhered to the surface of the sintered product to make the surface of the sintered product coarse.

In the silicon nitride based composite sintered product disclosed in Japanese Patent Laid-Open No. 50,167/1992, there is provided a ultrafine composite construction in which heat resistant compound particles or grains such as fine silicon carbide (SiC) at some nanometers ($10^{-9}$ m) are dispersed, as the second phase into silicon nitride particles or grains at some microns, thereby considerably improving the high temperature characteristic, particularly the strength at a high temperature. However, at present, the aforementioned the silicon nitride based composite sintered product is produced by the hot press method or the HIP method, not useful for mass production, for providing the fineness of the sintered product.

SUMMARY OF THE INVENTION

In view of the above-described problem, it is an object of the present invention to provide a silicon nitride based sintered product which uses inexpensive silicon as a raw material and which is high in mechanical strength and is excellent in heat resistance, resistance to thermal shock and corrosion resistance.

According to the present invention, a required molded product is prepared from a mixture with a compound (oxide, nitride or silicide) of silicon (Si), aluminum (Al), yttrium (Y), oxygen (O), nitrogen (N), iron (Fe) and at least one of 5a group elements (V, Nb, Ta) in the periodic table, and the resultant molded product is heated in an atmosphere including a nitrogen component to thereby obtain a silicon nitride based sintered product which is free from pores and remaining silicon, is dense and has a high strength.

In the present invention, as the main raw material for the silicon nitride based sintered product, the inexpensive silicon (Si) or/and silicon nitride ($Si_3N_4$) powder is used, and as the sintering assistant, the oxide of aluminum and yttrium or the like is used to mold a molded product. In sintering the molded product, the molded product is coated in advance with powder for suppressing the vaporization of the sintering assistant, particularly, the silicon powder before sintering to thereby obtain a silicon nitride based sintered product, which is free from segregation or omnipresentation of the sintering assistant, has a uniform tissue, and has a surface having a high mechanical strength.

The reacted sintered silicon nitride based sintered product according to the present invention comprises a crystal phase of silicon nitride, a grain boundary phase of a crystalline substance comprising silicon, aluminum, yttrium, oxygen and nitrogen, a silicide phase of 5a group elements in the periodic table containing at least one of tantalum, niobium and vanadium, and a silicide phase of iron as an impurity.

In the present invention, for providing the fineness of the sintered product by a low pressure sintering method, use is made of silicon powder containing iron as an impurity or silicon nitride powder containing iron as an impurity as the main raw material. A molded product is formed from a mixture in which a sintering assistant powder and an oxide powder of 5a group elements in the periodic table are added. The molded product is sintered at a temperature of 1750° to 2000° C. in a nitrogen gas at atmospheric pressure of 10 or less to obtain a fine composite (in-situ) silicon nitride based sintered product.

Since a melting point of the oxide of 5a group elements in the periodic table is approximately 1700° C., the oxide of 5a group elements in the periodic table contained in the molded product is changed into a liquid phase for promoting the sintering at a temperature of 1700° C. or below and then heated to 1750° C. or above. Then, the oxide of 5a group elements in the periodic table in some nanometers is changed into a silicide of 5a group elements in the periodic table at a high melting point, uniformly dispersed and separated into a matrix of silicon nitride ($Si_3N_4$). The particle size of the silicide of 5a group elements in the periodic table is 5 micron or less. A part of the silicide of 5a group elements in the periodic table is present in the grain boundary phase, and the remainder is present in the form taken into the silicon nitride grain or crystal phase.

In the present invention, as the sintering assistant, yttria and alumina are used, and as the 5a group elements in the periodic table, at least one of niobium, vanadium and tantalum. Particularly, when the addition amount of the oxide of the 5a group elements in the periodic table is set to 0.05 to 15 wt. %, there can be obtained the corrosion resistance and the heat resistant strength.

Since silicon (Si) and silicon nitride ($Si_3N_4$) containing much iron (Fe) as an impurity can be used in raw materials, it is possible to provide many kinds of mechanical structural members in inexpensive cost, the mechanical structural member being excellent in mechanical strength at a high temperature.

As compared with the conventional silicon nitride based sintered product using silicon nitride as a main raw material, the contraction amount of volume of the silicon nitride based sintered product by the present invention caused by sintering can be reduced to ½ to ⅓ of that of the conventional silicon nitride based sintered product. The near netting property is excellent and the producing cost can be reduced.

BRIEF DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENTS

Figure 1:
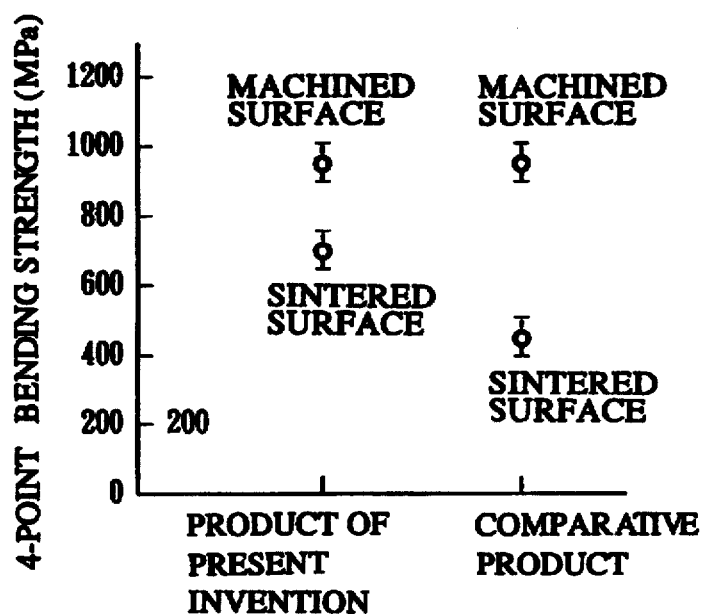
FIG. 1 is a diagram showing the 4-point bending strength of the silicon nitride based sintered product obtained according to the present invention and the comparative sample, respectively.

The silicon nitride based sintered product according to the present invention uses essentially a silicon (Si) or a mixture powder of silicon and silicon nitride as the raw material, and a molded product is prepared from a mixture obtained by adding a sintering assistant powder of silicon nitride and a compound powder containing vanadium (V), niobium (Nb) and tantalum (Ta) in 5a group elements of the periodic table to the raw material, said molded product being sintered.

The inexpensive silicon (Si) and silicon nitride ($Si_3N_4$), which contain much iron (Fe) as an impurity, can be used. The silicon nitride based sintered product contains therein 55 to 65 parts of silicon, and 25 to 35 parts of silicon nitride.

As the sintering assistant for the silicon nitride, alumina ($Al_2O_3$) and yttria ($Y_2O_3$) are used. The silicon nitride based sintered product contains therein 3 to 5 parts of alumina and 6 to 7 parts of yttria.

For 5a group elements in the periodic table, at least one of vanadium (V), niobium (Nb) and tantalum (Ta) is used. The 5a group elements in the periodic table are present, within the silicon nitride based sintered product, as a compound (oxide, nitride, silicide, etc.) of vanadium oxide ($V_2O_3$), niobium oxide ($Nb_2O_5$) and tantalum oxide ($Ta_2O_5$). The silicon nitride based sintered product contains therein 0.1 to 5 parts of 5a group elements in the periodic table. In other words, the silicon nitride based sintered product contains therein 0.005 to 5 wt. % of 5a group elements in the periodic table. The 5a group elements in the periodic table serve to decrease the contraction amount of volume of the molded product caused by sintering.

In the present invention, the surface of the molded product having the silicon nitride as a main component is coated, before sintering, with the silicon (Si) powder, and then sintered in an atmosphere containing nitrogen to increase the mechanical strength of the sintered surface. In sintering the molded product, the silicon (Si) coated on the surface of the molded product is converted into the silicon nitride ($Si_3N_4$) to coat the sintered surface, thus suppressing the segregation or omnipresentation of the sintering assistant component and forming a uniform and dense sintered surface and a surface layer portion. The mechanical properties of the silicon nitride based sintered product are improved by the uniform and dense surface layer portion.

In the silicon nitride based sintered product according to the present invention, when the values converted in weight of components of silicon (Si), aluminum (Al), yttrium (Y), iron (Fe), tantalum (Ta), nitrogen (N) and oxygen (O) contained in said silicon nitride based sintered product to silicon nitride ($Si_3N_4$), alumina ($Al_2O_3$), yttria ($Y_2O_3$), ferrous iron oxide ($Fe_2O_3$), and tantalum oxide ($Ta_2O_3$) are represented by a, b, c, d and e, the following formulae are fulfilled:

$$1 \leq 100(b+c+d+e) \times (a+b+c+d+e) \leq 15, 1 \leq (b+c)/d \cdot 0.005 \leq 100 d/(a+b+c+d+e) \leq 7.5, \text{ and } 0.005 \leq e/(b+c) \leq 1$$

The silicon nitride based sintered product according to the present invention is free from pores and remaining silicon, is dense and is excellent in mechanical strength. According to the observation using a scanning type electronic microscope (SEM), Compound particles having a particle diameter of 0.2 micron or more containing the 5a group elements in the periodic table included in the silicon nitride based sintered product occupies an area of 0.1 to 9.0% in a two dimensional region of 200 micron×200 micron.

EXAMPLE 1

Powders consisting of inexpensive silicon (Si) containing much iron (Fe) as an impurity, silicon nitride ($Si_3N_4$), alumina ($Al_2O_3$), yttria ($Y_2O_3$) and tantalum oxide ($Ta_2O_5$)

were mixed in a weight ratio (a composition ratio) shown in Table 1 (samples 1 to 7). The resultant mixture was put into a resin-made pot together with methanol, disperse agent and resin balls, which was then subjected to ball milling for 48 hours to prepare slurry. Then, the slurry was dried and crushed, and molded by a press machine. The molded product was pressed by a cold isostatic press method (CIP) at a pressure of 2000 kgf/cm$^2$ to prepare a molded product. The molded product was sintered at a temperature of 1800° to 1900° C. in a nitrogen atmosphere at pressure of 9.5 kgf/cm$^2$ to obtain a silicon nitride based sintered product.

The thus obtained silicon nitride based sintered product was subjected to a 4-point bending strength (anti-break strength) test. The result is shown in Table 1.

powder. From this mixture powder, a block-like molded product having a dimension of 15×60×7 mm was molded at a molding pressure of approximately 2000 kg/cm$^2$ by the CIP. The molded product was reacted and sintered for about 10 hours in a nitrogen-contained atmosphere at a temperature of about 1400° C.

Then, fine powder of silicon (Si) was mixed with ethanol to prepare slurry. The slurry was coated on the surface of the reacted sintered product to form a coated layer having a thickness of about 200 micron. The reacted sintered product was then sintered for about 5 hours in a nitrogen-contained atmosphere at a temperature of about 1900° C. to prepare a silicon nitride based sintered product.

As a comparative sample, a molded product similar to that of the former was reacted and sintered, and then sintered as

TABLE 1

| Sample No. | material (wt. part) | | | | | bending strength | | |
| | Si | $Si_3N_4$ | $Y_2O_3$ | $Al_2O_3$ | P. Table 5a group element | room MPa | 1000° C. MPa | area (%) |
| --- | --- | --- | --- | --- | --- | --- | --- | --- |
| Comp. | 59.2 | 30.9 | 6.49 | 3.89 |  | 940 | 620 | 0 |
| 1 | 59.2 | 30.9 | 6.49 | 3.89 | $Ta_2O_5$ 0.1 | 936 | 650 | 0.15 |
| 2 | 59.2 | 30.9 | 6.49 | 4.30 | $Ta_2O_5$ 0.25 | 982 | 720 | 0.37 |
| 3 | 59.2 | 30.9 | 6.49 | 3.89 | $Ta_2O_5$ 0.5 | 1041 | 973 | 0.85 |
| 4 | 59.2 | 30.9 | 6.49 | 4.13 | $Ta_2O_5$ 1.0 | 1020 | 943 | 1.8 |
| 5 | 59.2 | 30.9 | 6.49 | 3.89 | $Ta_2O_5$ 1.5 | 988 | 801 | 2.4 |
| 6 | 59.2 | 30.9 | 6.49 | 3.89 | $Ta_2O_5$ 2.0 | 836 | 605 | 4.3 |
| 7 | 59.2 | 30.9 | 6.49 | 3.89 | $Ta_2O_5$ 5.0 | 709 | 535 | 8.6 |
| 8 | 59.2 | 30.9 | 6.49 | 3.89 | $V_2O_3$ 0.5 | 948 | 715 | 0.4 |
| 9 | 59.2 | 30.9 | 6.49 | 3.89 | $Nb_2O_5$ 0.5 | 930 | 695 | 0.3 |

EXAMPLE 2

Powders oxide of at least one element selected from tantalum (Ta), vanadium (V) and niobium (Nb) in 5a group elements in the periodic table in place of the tantalum oxide ($Ta_2O_5$) were mixed in a weight ratio shown in Table 1 (samples 8 and 9) to sinter it under the same conditions as that of Example 1 to obtain a silicon nitride based sintered product. The thus obtained silicon nitride based sintered product was subjected to a 4-point bending strength test. The result is shown in Table 1.

Table 1 shows the 4-point bending strengths at room temperature and high temperature (1000° C.) of samples of the silicon nitride based sintered product according to the present invention and a comparative sample of the silicon nitride based sintered product having no 5a group elements in the periodic table added thereto. The 4-point bending strength of the comparative sample of the silicon nitride based sintered product having no 5a group elements in the periodic table added thereto was 940 MPa whereas in the silicon nitride based sintered product according to the present invention having tantalum oxide ($Ta_2O_5$) added thereto, the 4-point bending strengths were 1041 MPa at room temperature and 973 MPa at a temperature of 1000° C., respectively, showing a very high strength. It was also confirmed that the contraction amount of volume of the molded product caused by the sintering is small.

EXAMPLE 3

The silicon (Si) powder, silicon nitride ($Si_3N_4$) powder, alumina ($Al_2O_3$) powder and yttria ($Y_2O_3$) powder were measured in the weight ratio of 58:31:4:7. These powders were mixed together with ethanol by a ball mill to prepare slurry. The slurry was dried and crushed to prepare a mixture it is (without forming a slurry coated layer obtained by mixing fine powder of silicon (Si) with ethanol) to prepare a silicon nitride based sintered product.

For the silicon nitride based sintered products of Example 3 and the comparative sample, 4-point bending strengths of the sintered surface and the processed surface were measured in compliance with JIS 1601. The result of measurement is shown in FIG. 1.

As will be apparent from FIG. 1, the strength of the sintered surface of the silicon nitride based sintered product obtained by the method of the present invention was 720 MPa, which was materially improved as compared to the comparative sample, whose strength was 450 MPa. It is understood that the strength of the processed surface is not impaired.

Figure 2:
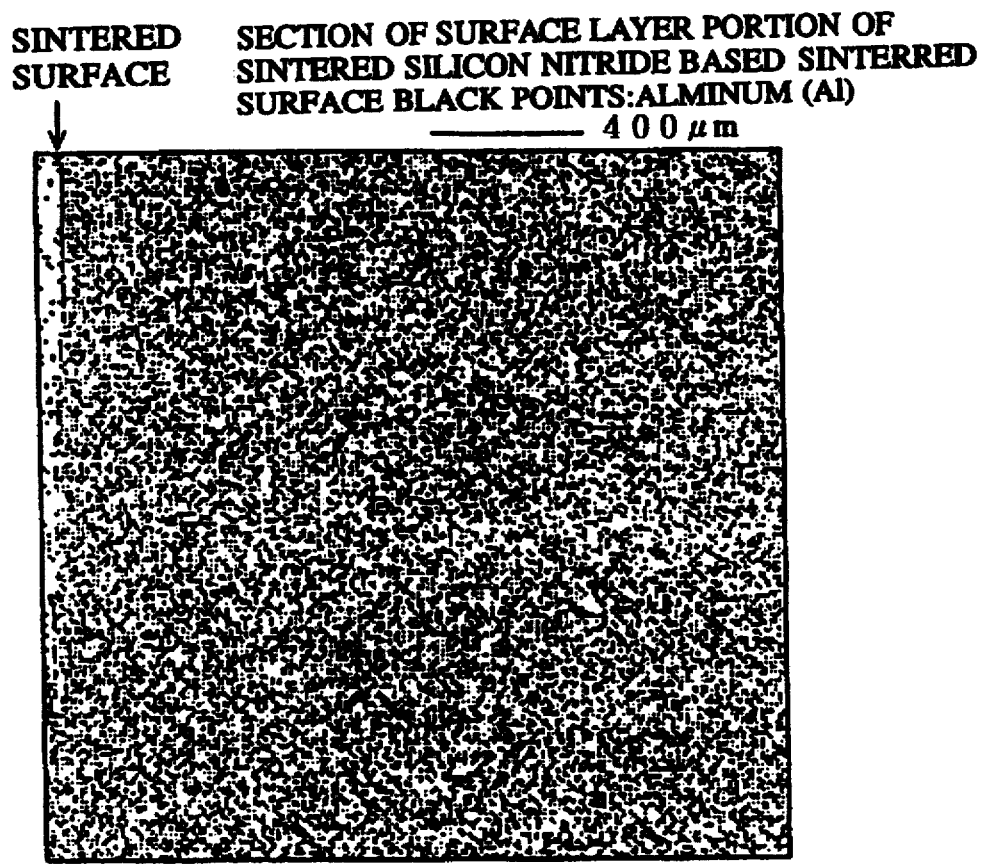
FIG. 2 is a sectional view showing the distribution state of aluminum components in the surface layer portion of silicon nitride based sintered product obtained according to the present invention.
Figure 3:
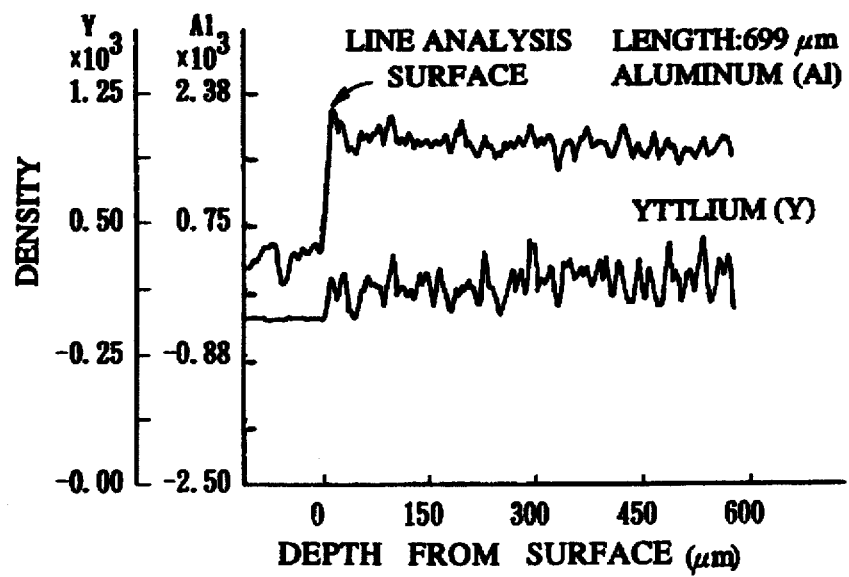
FIG. 3 is a diagram showing the analytical result of alumina and yttrium of the surface layer portion of the silicon nitride based sintered product according to EPMA.
Figure 11:
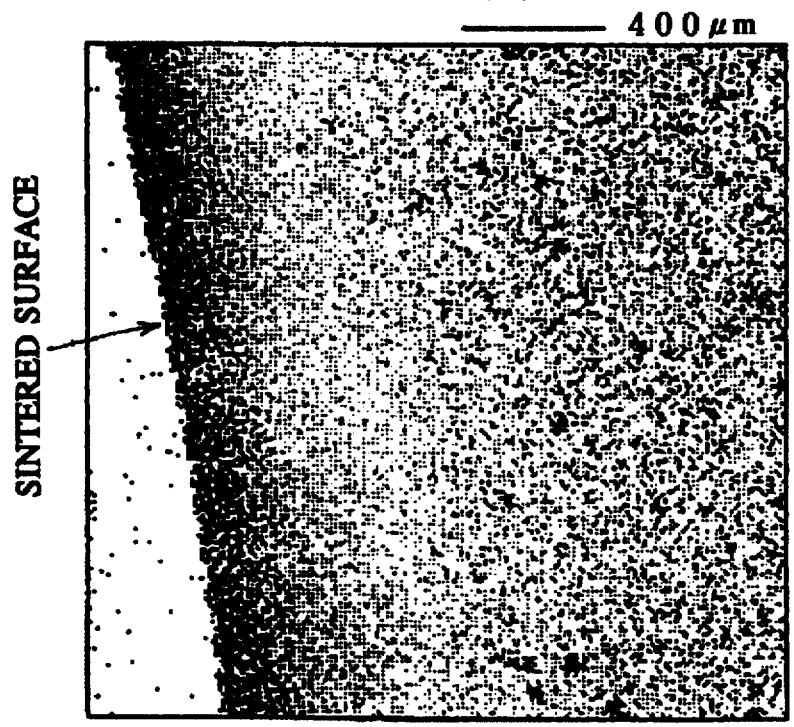
FIG. 11 is a sectional view showing the distribution state of aluminum components on the surface layer portion of the silicon nitride based sintered product according to the comparative sample.
Figure 12:
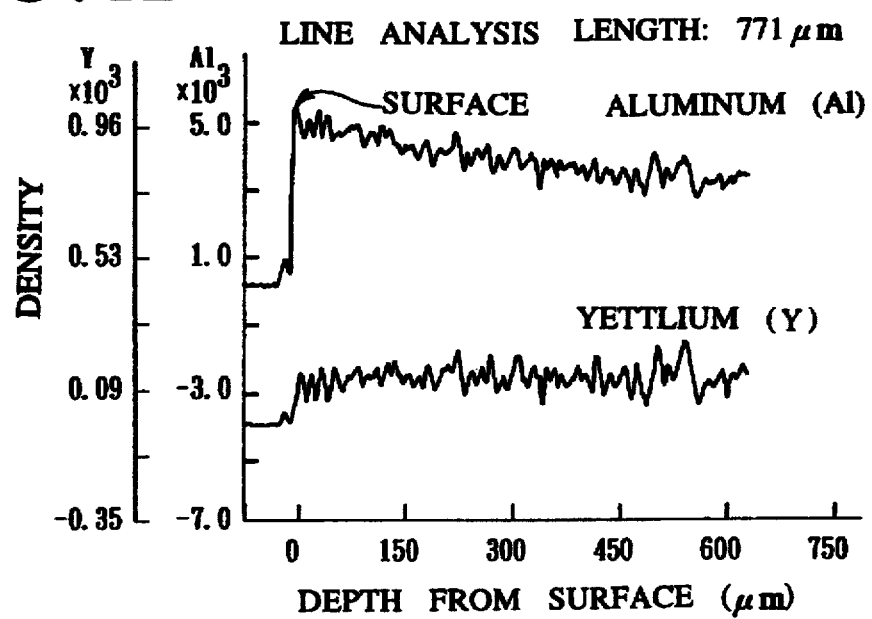
FIG. 12 is a diagram showing the analytical result of aluminum and yttrium of the surface layer portion of the silicon nitride based sintered product according to the comparative sample according to EPMA.

For the silicon nitride based sintered products of Example 3 and the comparative sample, the sections (polished surfaces) of the silicon nitride based sintered products were analyzed using EPMA (Electro-Probe Micro-Analyzer). FIGS. 2 and 11 are sectional views of the surface layer portions of the silicon nitride based sintered products of Example 3 and the comparative sample, respectively. FIGS. 3 and 12 are diagrams indicative of the results of X-ray analysis of aluminum and yttrium (the result of analysis of aluminum element and yttrium element in a section (a polished surface) having an area of 1 mm$^2$ on the surface layer portions) of the silicon nitride based sintered products of Example 3 and the comparative sample, respectively. It has been confirmed from these analytical results that in the silicon nitride based sintered product by the present invention, elements of aluminum and yttrium were uniformly distributed as compared with the comparative sample.

Figure 4:
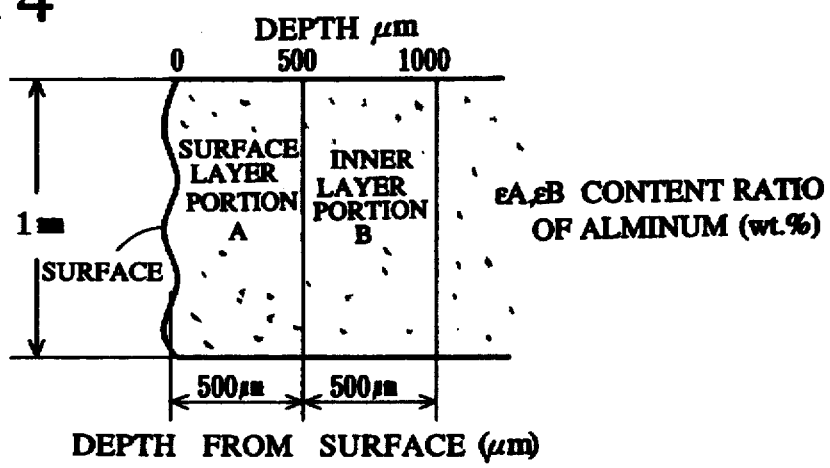
FIG. 4 is a view schematically showing a section of the silicon nitride based sintered product.
Figure 5:
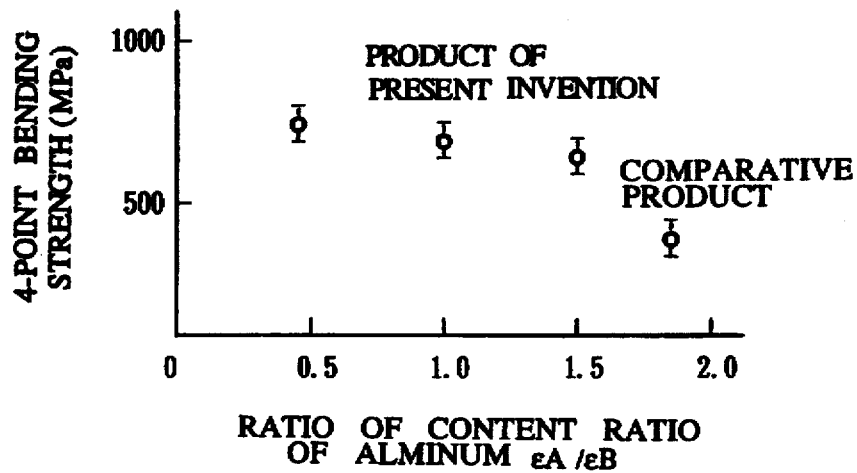
FIG. 5 is a diagram showing the relation between the ratio of the content ratio of aluminum components in the surface layer portion of the silicon nitride based sintered product with respect to the content ratio of aluminum components in the inner layer portion of the silicon nitride based sintered product, and the mechanical strength.

As shown in FIG. 4, the relationship between the ratio (εA/εB) of the content ratio εA of the aluminum component on the surface layer portion A (the layer of depth 0 to 500 micron from the surface) with respect to the content ratio ε B of the aluminum component on the inner layer portion B (the layer of depth 500 to 1000 micron from the surface) and the mechanical strength in the silicon nitride based sintered product obtained by Example 3 was investigated. The result obtained is as shown in FIG. 5. It has been confirmed that according to the present invention, the molded product is sintered after being coated with the silicon powder to thereby obtain the silicon nitride based sintered product which is free from segregation or omnipresentation of the sintering assistant, has a uniform tissue, and has a sintered surface and a surface layer portion having a high mechanical strength.

EXAMPLE 4

The silicon nitride ($Si_3N_4$) powder, alumina ($Al_2O_3$) powder and yttria ($Y_2O_3$) powder were measured in the weight ratio of 92:3:5. These powders were mixed together with ethanol by a ball mill to prepare slurry. The slurry was dried and crushed to prepare a mixture powder. The molded product was prepared from this mixture powder, and a cylindrical molded product having an outside diameter of 35 mm, an inside diameter of 23 mm and a height of 24 mm was molded by the CIP. The molded product was reacted and sintered for about 10 hours in a nitrogen-contained atmosphere at a temperature of about 1400° C., in a manner similar to that of Example 3.

Figure 7:
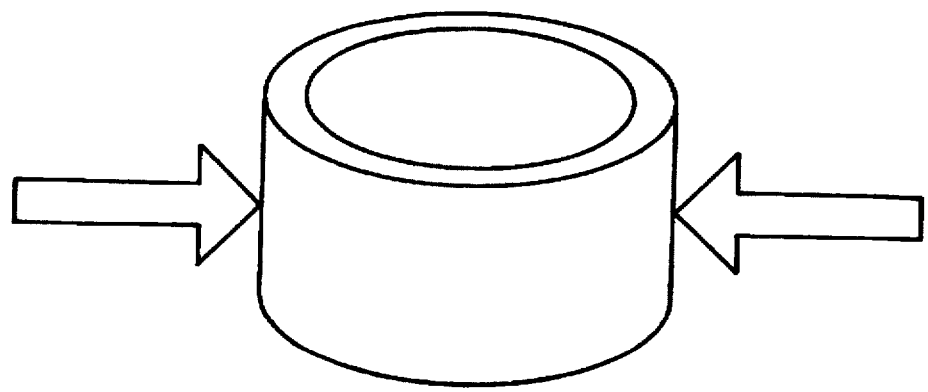
FIG. 7 is a perspective view showing a breakdown testing method of the silicon nitride based sintered product.

Then, fine powder of silicon (Si) was mixed with ethanol to prepare slurry. The slurry was coated on the surface of the reacted sintered product to form a coated layer having a thickness of about 200 micron. The reacted sintered product was then sintered for about 5 hours in a nitrogen-contained atmosphere at a temperature of about 1900° C. to prepare a silicon nitride based sintered product, as shown in FIG. 7.

As a comparative sample, a molded product similar to that of the former was reacted and sintered, and then sintered as it is (without forming a slurry coated layer obtained by mixing fine powder of silicon (Si) with ethanol) to prepare a silicon nitride based sintered product.

Figure 6:
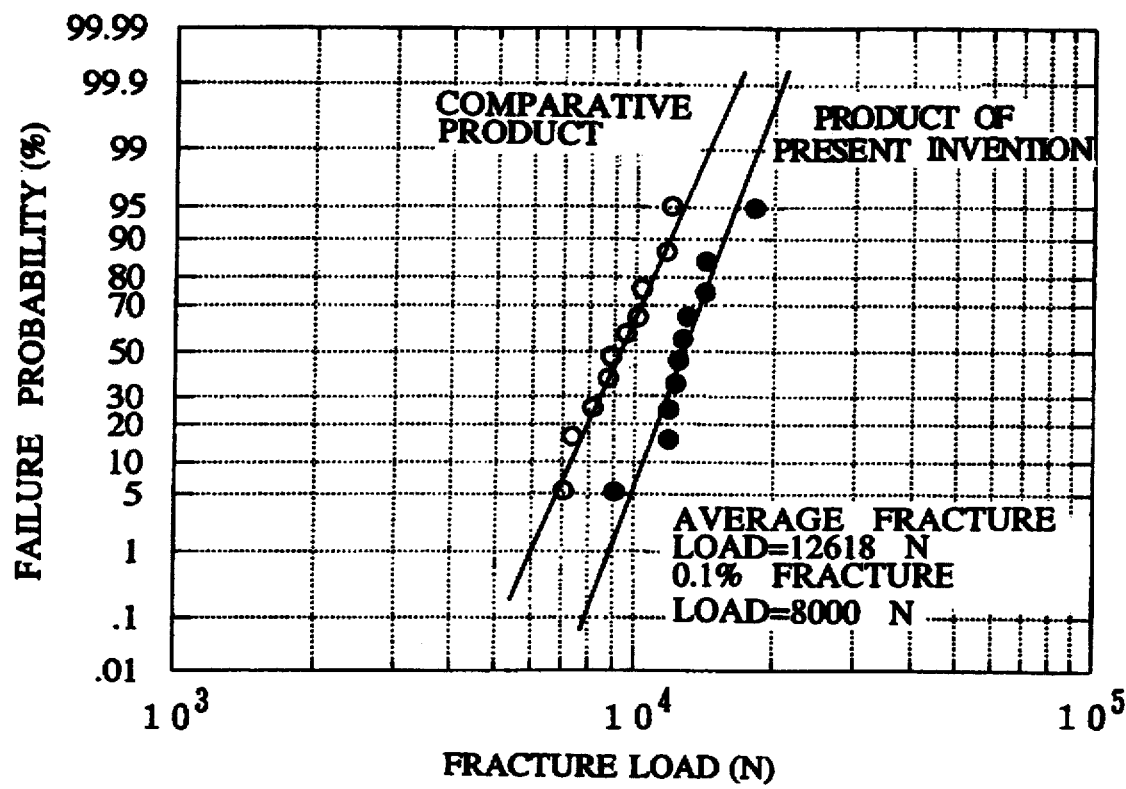
FIG. 6 is a diagram showing the breakdown characteristics of the silicon nitride based sintered product of the invention and the comparative sample, respectively.

For the silicon nitride based sintered products of Example 4 and the comparative sample, the outer peripheral surfaces thereof were subjected to lapping after grinding, and the inner peripheral surfaces thereof remained unprocessed. As indicated by the arrow in FIG. 7, the breakdown loads were measured when the diametral load is applied to the silicon nitride based sintered products of Example 4 and the comparative sample. FIG. 6 is a diagram showing the results of the breakdown test for the cylindrical silicon nitride based sintered product according to the present invention and the silicon nitride based sintered product according to the comparative sample.

In the cylindrical silicon nitride based sintered product obtained according to the present invention, the strength of the inner peripheral surface, i.e., the sintered surface, was improved as compared with the comparative sample, and the breakdown strength was improved accordingly.

EXAMPLE 5

Inexpensive silicon (Si) powder containing approximately 0.3 wt. % of iron as an impurity, silicon nitride ($Si_3N_4$) powder, yttria ($Y_2O_3$) powder, alumina ($Al_2O_3$) powder and oxide powder of 5a group elements in the periodic table such as vanadium, niobium and tantalum were mixed in the weight compounding ratio shown in Table 2. The mixture powder along with methanol were put into a resin-made pot and subjected to ball milling for about 48 hours to prepare slurry. Then, the slurry was dried and crushed and after this, a molded product was molded from the slurry by the press machine. The molded product was then subjected to the CIP processing at pressure of approximately 2000 kgf/cm². The molded product was first nitrogenized for 10 hours in a nitrogen atmosphere at a temperature of about 1400° C., and subsequently sintered for 4 to 8 hours at a temperature of about 1900° C. to obtain a silicon nitride based sintered product.

Figure 8:
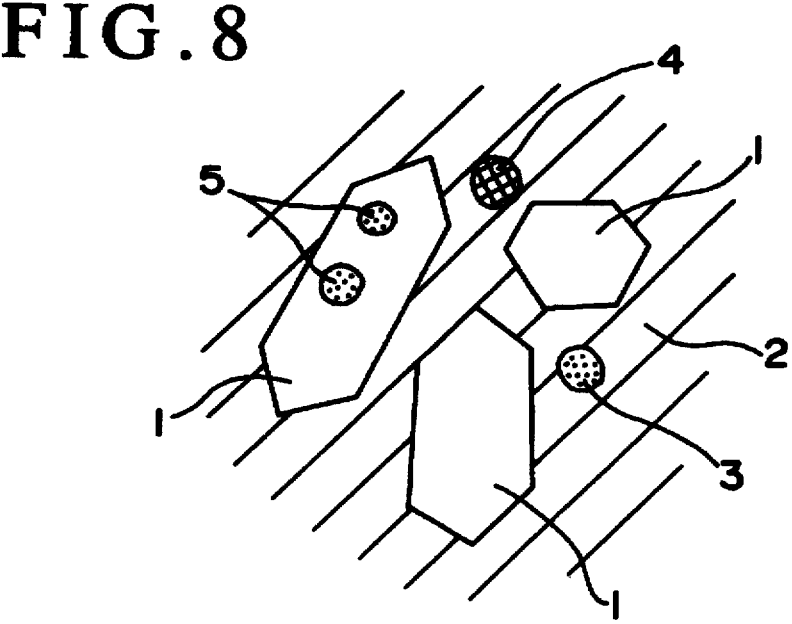
FIG. 8 is a texture view schematically showing the silicon nitride based composite sintered product.

FIG. 8 is a texture view schematically showing the silicon nitride based sintered product obtained as described above. The silicon nitride based sintered product according to the present invention comprises a silicon nitride crystal phase 1, a grain boundary phase 2 of a crystalline substance comprising silicon, aluminum, yttrium, oxygen and nitrogen, silicide phases and 5 of 5a group elements in the periodic table, and a silicide phase 4 of iron. Particularly, the particle size of the silicide of 5a group elements in the periodic table is 5 micron or less. A part of a compound phase 5 of 5a group elements in the periodic table is present within the silicon nitride crystal phase 1, and the remainder of the compound phase 5 is present in the grain boundary phase 2.

In connection with the silicon nitride based sintered products according to the present invention and the comparative samples, the 4-point bending strength test was conducted in compliance with JIS 1601. Table 2 shows the composition of raw materials, the relative density of the

TABLE 2

| Sample No. | material (wt. %) | | | | | relative density | bending strength | |
|---|---|---|---|---|---|---|---|---|
| | Si | $Si_3N_4$ | $Y_2O_3$ | $Al_2O_3$ | P. Table 5a group | | room MPa | 1000° C. MPa |
| 1 | 60 | 30 | 5 | 4.5 | $Ta_2O_5$ 0.5 | 99.5 | 980 | 795 |
| 2 | 60 | 30 | 4 | 4 | $Ta_2O_5$ 2.0 | 99.2 | 1050 | 815 |
| 3 | 60 | 20 | 6 | 7 | $Ta_2O_5$ 5.0 | 99.3 | 1020 | 870 |
| 4 | 60 | 20 | 3 | 2 | $Ta_2O_5$ 15.0 | 99.2 | 992 | 810 |
| 5 | 60 | 20 | 8 | 7 | $Nb_2O_5$ 5.0 | 99.0 | 920 | 805 |
| 6 | 60 | 20 | 8 | 7 | $V_2O_3$ 5.0 | 98.5 | 875 | 742 |
| Comp. | 55 | 20 | 2 | 2 | $Ta_2O_5$ 21.0 | 85.6 | 560 | 480 |
| Comp. | 30 | 30 | 5 | 5 | $Ta_2O_5$ 30.0 | 82.4 | 550 | 482 |
| Comp. | 60 | 30 | 5 | 5 | | 78.6 | 452 | 436 | silicon nitride based sintered product (the ratio of theoretical density to actual density), and the result of 4-point bending strength test.

Figure 9:
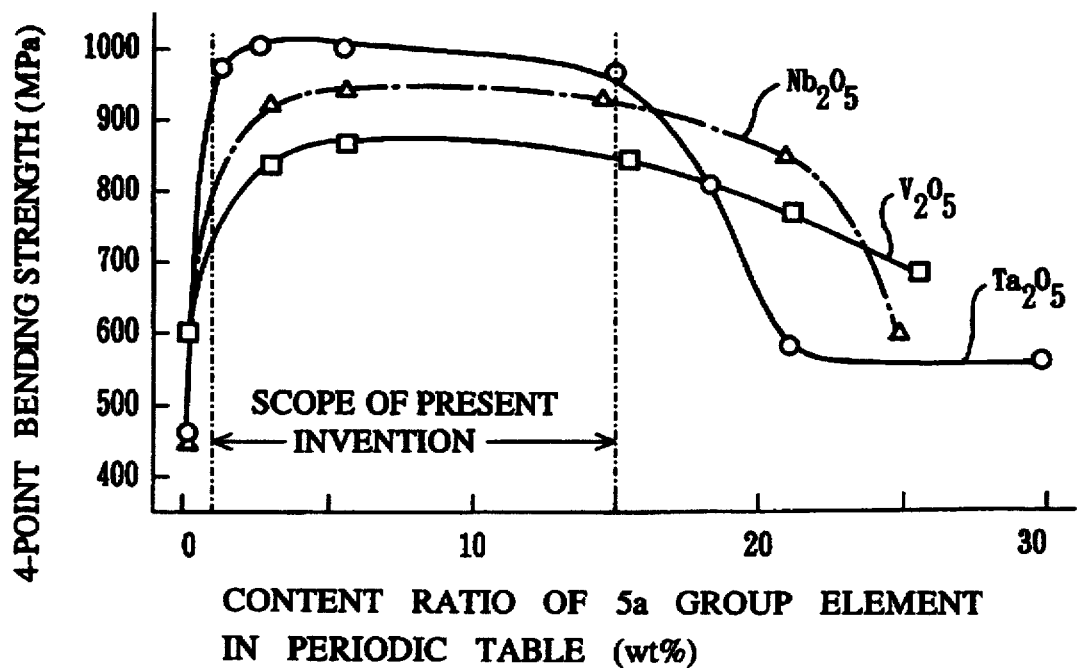
FIG. 9 is a diagram showing the relation between the addition amount of the oxide of 5a group elements in the periodic table of the silicon nitride based sintered product and the 4-point bending strength.
Figure 10:
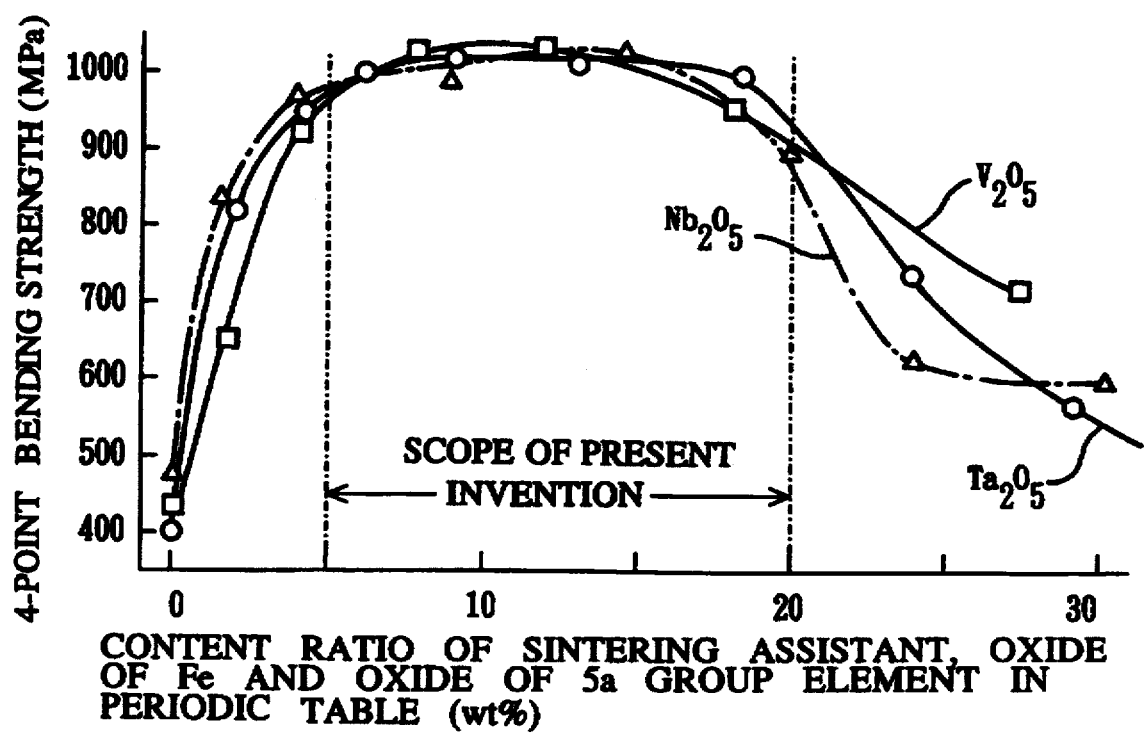
FIG. 10 is a diagram showing the relationship between the addition amount of the sintering assistant, the oxide of 5a group elements in the periodic table and the oxide of iron in the silicon nitride based sintered product, and the 4-point bending strength.

As shown in the Table 2 and FIGS. 9 and 10, according to the present invention, when the elements of silicon, aluminum, yttrium, nitrogen, oxygen, iron and 5a group elements in the periodic table contained said silicon nitride based sintered product are converted to silicon, silicon nitride, alumina, yttria, oxide of iron and oxide of 5a group elements in the periodic table, the addition amount of alumina, yttria, oxide of iron and oxide of 5a group elements in the periodic table is 5 to 20 wt. %, and particularly, the addition amount of the oxide of 5a group elements in the periodic table such as vanadium, niobium and tantalum is 0.05 to 15 wt. %. With this, the excellent heat resistant strength is obtained in which 4-point bending strength at normal temperature is 850 to 1050 MPa and that at 1000° C. is 700 MPa or more.

Obviously, many modifications and variations of the present invention are possible in right of the above teachings. It is to be understood, therefore, that the invention can be practiced otherwise than as specifically described.

What is claimed is:

1. A silicon nitride based sintered product having strength at a high temperature characterized in that said silicon nitride based sintered product is obtained by sintering a mixture, said mixture being a silicon powder or a mixture powder of silicon and silicon nitride added a sintering assistant powder for silicon nitride, a compound powder of iron and a compound powder containing at least one of vanadium, niobium and tantalum in 5a group elements of the periodic table.

2. The silicon nitride based sintered product having strength at a high temperature according to claim 1, wherein said silicon nitride based sintered product contains silicon, aluminum, yttrium, oxygen, nitrogen, iron and at least one of 5a group elements in the periodic table, and when weights at which said elements are present as a compound of silicon nitride, alumina, yttria, a compound powder of iron and a compound powder of 5a group elements in the periodic table are represented by a, b, c, d and e, the following formulae are fulfilled:

$1 \leq 100(b+c+d+e)/(a+b+c+d+e) \leq 15$, $1 \leq (b+c)/d$, $0.005 \leq 100d/(a+b+c+d+e) \leq 7.5$, and $0.005 \leq e/(b+c) \leq 1$.

3. The silicon nitride based sintered product having strength at a high temperature according to claim 1, wherein said 5a group elements in the periodic table are compound particles having a particle diameter of over 0.2 micron and said compound particles are 0.1 to 9.0% in a ratio of an area occupied by 200 micron×200 micron of a two dimensional region.

4. The silicon nitride based sintered product having strength at a high temperature according to claim 1, wherein the ratio $\epsilon A/\epsilon B$ of the content ratio $\epsilon$ B of an aluminum component contained in a layer of depth of 500 to 1000 micron from the surface of the silicon nitride based sintered product with respect to the content ratio $\epsilon$ A of an aluminum component contained in a layer of depth of 0 to 500 micron from the surface of the silicon nitride based sintered product is less 1.5.

5. The silicon nitride based sintered product having strength at a high temperature according to claim 1, wherein said silicon nitride based sintered product comprising a crystal phase of silicon nitride, a grain boundary phase comprising said sintering assistant and said 5a group elements in the periodic table, a silicide phase of at least one of 5a group elements in the periodic table, and a silicide phase of iron.

6. The silicon nitride based sintered product having strength at a high temperature according to claim 5, wherein said grain boundary phase is a crystalline substance comprising silicon, aluminum, yttrium, oxygen, nitrogen and at least one of 5a group elements in the periodic table.

7. The silicon nitride based sintered product having strength at a high temperature according to claim 5, wherein the addition amount of said silicide phase of 5a group elements in the periodic table is under 15 wt. % in conversion of oxide of 5a group elements in the periodic table as a starting material.

8. The silicon nitride based sintered product having strength at a high temperature according to claim 5, wherein the particles of said silicide phase of 5a group elements in the periodic table are uniformly dispersed in said silicon nitride based sintered product, and a part thereof is present in the grain boundary phase whereas the remainder is present in the form taken into said silicon nitride crystal phase.

9. The silicon nitride based sintered product having strength at a high temperature according to claim 5, wherein said silicide phase of 5a group elements in the periodic table comprises particles having a particle diameter of less 5 micron.

10. The silicon nitride based sintered product having strength at a high temperature according to claim 6, wherein when the elements of silicon, aluminum, yttrium, nitrogen, oxygen, iron and 5a group elements in the periodic table contained said silicon nitride based sintered product are converted to silicon, silicon nitride, yttria, alumina, oxide of iron and oxide of 5a group elements in the periodic table, the addition amount of alumina, yttria, oxide of iron and oxide of 5a group elements in the periodic table is 5 to 20 wt. %, and the addition amount of the oxide of 5a group elements in the periodic table is 0.05 to 15 wt. %.

* * * * *

UNITED STATES PATENT AND TRADEMARK OFFICE
CERTIFICATE OF CORRECTION

PATENT NO. : 5,695,544
DATED : December 9, 1997
INVENTOR(S) : Toshiyuki YAMADA

It is certified that error appears in the above-indentified patent and that said Letters Patent is hereby corrected as shown below:

TITLE PAGE [57] ABSTRACT

Line 9, "element" should be --elements--.

Column 1

Line 26, "(A12033)" should be --(A1203)--.
Line 54, "phase into" should be --phase, into--.

Column 3

Line 27, "alumina" should be --aluminum--.

Column 8

Table 2, Sample No. 3 line, 4th column, "6" should be --8--.
Line 55, after "phases", insert --3--.

Signed and Sealed this

Twenty-fourth Day of March, 1998

Attest:

BRUCE LEHMAN

*Attesting Officer*  *Commissioner of Patents and Trademarks*